United States Patent Office 3,838,111
Patented Sept. 24, 1974

3,838,111
AMORPHOUS COPOLYAMIDE FROM BIS-(4-AMINOCYCLOHEXYL)METHANE, PHENYL-INDANEDICARBOXYLIC ACID AND ALKANE DICARBOXYLIC ACID
Robert W. Campbell, Bartlesville, Okla., assignor to Phillips Petroleum Company
No Drawing. Filed Dec. 21, 1971, Ser. No. 210,598
Int. Cl. C08g 20/20
U.S. Cl. 260—78 R         8 Claims

ABSTRACT OF THE DISCLOSURE

Substantially amorphous, optically clear polyamides are produced from a bis(4-aminocyclohexyl)methane or methyl derivative thereof and a phenylindanedicarboxylic acid or alkyl derivative thereof. Copolyamides having desirable processing properties are produced by polymerizing the above monomers and at least one straight chain dicarboxylic acid as an additional monomer. The resulting polymers are useful as fibers as well as molding resins.

---

This invention relates to the production of polyamides. In accordance with another aspect, this invention relates to the production of amorphous, optically clear polyamides from bis(4-aminocyclohexyl)methane compounds and phenylindanedicarboxylic acids. In accordance with a further aspect, this invention relates to copolyamides formed from bis(4-aminocyclohexyl)methane compounds, phenylindanedicarboxylic acids, and straight chain dicarcarboxylic acids. In accordance with still another aspect, this invention relates to polyamides and copolyamides as defined above which are useful as fibers and molding resins. In accordance with a further aspect, this invention relates to polyamides or copolyamides that are filled which exhibit excellent properties and are useful as molding resins.

Various polyamides formed from the condensation reaction of bis(4-aminocyclohexyl)methane, herein referred to as PACM, or methyl derivatives thereof and various dicarboxylic acids are known. Such materials are often employed as synthetic fibers, as well as being formed into other molded articles. It has now been found that there can be produced a polyamide of PACM or methyl derivative thereof and a phenylindanedicarboxylic acid and, optionally, with a straight chain dicarboxylic acid as an additional monomer, which evidences unusual properties in respect to making a polyamide suitable for molding, especially if the polyamide is produced from PACM or methyl derivative thereof in which at least 40 percent of the PACM or methyl derivative thereof is of the *trans-trans* configuration.

Accordingly, an object of this invention is to provide novel polyamides having desirable molding characteristics.

Another object of this invention is to provide novel copolyamides suitable for molding.

Another object of this invention is to provide polyamides that can be filled with suitable filler materials yielding products suitable for molding.

Other objects and aspects, as well as the several advantages of the invention, will be apparent to those skilled in the art upon reading the specification and the appended claims.

In accordance with this invention, substantially amorphous, optically clear polyamides are produced by the polymerization of bis(4-aminocyclohexyl)methane or methyl derivatives thereof with a phenylindanedicarboxylic acid or alkyl derivative thereof.

Further in accordance with the invention, copolyamides are produced from bis(4-aminocyclohexyl)methane or methyl derivatives and phenylindanedicarboxylic acids or alkyl derivatives thereof with straight chain dicarboxylic acids.

In accordance with a specific embodiment, a copolyamide possessing outstanding mechanical properties is produced from PACM and a mixture of dicarboxylic acids in which 75 percent of the acid is a straight chain dicarboxylic acid such as suberic acid and the remainder is a phenylindanedicarboxylic acid, specifically, 1,1,3-trimethyl-5-carboxyl-3-(p-carboxyphenyl)indane (PIDA).

The bis(4-aminocyclohexyl)methane or methyl derivative thereof for use in this invention can be represented by the formula

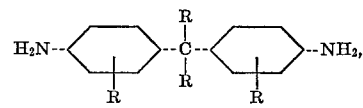

wherein each R is selected from hydrogen and methyl radicals. Mixtures of these diamines can be employed. Although any of the geometric isomers or mixtures thereof can be employed, it is preferred that at least 40 percent be of the *trans-trans* configuration. Specific compounds that have been polymerized include bis(4-aminocyclohexyl)methane (PACM) or its methyl derivatives, e.g., 2,2-bis(4-aminocyclohexyl)propane (PACP).

The phenylindanedicarboxylic acid or alkyl derivative thereof applicable in this invention can be represented by the formula

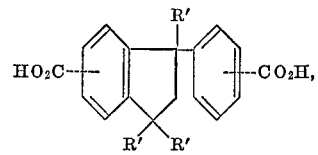

wherein each R' is selected from hydrogen and alkyl radicals having 1–3 carbon atoms. Mixtures of compounds represented by this formula can be employed. The compound of the above structure presently preferred for use in this invention is 1,1,3-trimethyl-5-carboxy-3-(p-carboxyphenyl)indane.

The straight chain dicarboxylic acid which optionally but preferably is used as a comonomer in the production of the polyamides of this invention can be represented by the formula $HO_2C(CH_2)_xCO_2H$, wherein $x$ is an integer of 4–16, preferably 5–10, these preferred values of 5–10 representing average values of $x$ when mixtures of straight chain dicarboxylic acids are employed.

The straight chain dicarboxylic acids containing 6 to 18 carbon atoms include adipic acid, pimelic acid, suberic acid, azelaic acid, sebacic acid, undecanedioic acid, pentadecanedioic acid, dodecanedioic acid, tridecanedioic acid, tetradecanedioic acid, heptadecanedioic acid, octadecanedioic acid, and hexadecanedioic acid and their mixtures.

In the polymerization process, the molar ratio of the dicarboxylic acid(s) to the diamine(s) should be substantially 1:1, although a slight excess, e.g., up to about 5 mole percent, of acid or amine can be used. When a straight chain dicarboxylic acid or mixture of such straight chain acids is employed, the straight chain dicarboxylic acid(s) can constitute up to 85 mole percent, generally 15–85 mole percent, of all the dicarboxylic acids used, preferably constituting 50–80 mole percent of the total amount of dicarboxylic acids employed.

Use of the straight chain dicarboxylic acids as herein preferred gives amorphous, optically clear polyamides which can be molded into objects having a particularly desirable balance of properties, e.g., a high degree of stiffness, excellent property retention at elevated temperatures, and good hydrolytic stability. A particularly outstanding polyamide is produced by polymerizing bis(4-aminocyclohexyl)methane having a *trans-trans* isomer content greater than 40 percent with a mixture of 75 mole percent suberic acid and 25 mole percent 1,1,3-trimethyl-5-carboxy-3-(p-carboxyphenyl)indane. Such a polyamide possesses an especially good balance of mechanical properties, property retention under a variety of conditions, and good melt processability. The polyamides and copolyamides are also useful in the production of fibers.

The polyamides of this invention can be prepared by conventional polymerization procedures, e.g., by a melt polymerization process such as that described in U.S. Pat. 2,512,606. The polymerization preferably is conducted at a temperature within the range of about 260–340° C. for about 2–6 hours; however, polymerization temperatures and reaction times outside these ranges can be employed. Water can be present to serve as a heat transfer agent and to aid in keeping the reactants in the reaction zone.

The polymers of this invention can be blended with various fillers or additives such as pigments, stabilizers, softeners, extenders, or other polymers. For example, there can be incorporated in the polymers of this invention substances such as graphite, carbon black, titanium dioxide, glass fibers, carbon fibers, metal powders, magnesia, silica, asbestos, wollastonite, clays, wood flour, cotton floc, alpha-cellulose, mica, and the like. A more complete list of fillers is disclosed in Modern Plastics Encyclopedia, *41*, No. 1a, September 1963, pages 529–536. If desired, such fillers can be added to the polymerization reactor.

EXAMPLE I

In the preparation of each in a series of polyamides, a mixture containing approximately equimolar quantities of diamine and dicarboxylic acid(s) was heated in the presence or absence of water to a final temperature of about 320° C. over a period of 2.5 hours under a nitrogen atmosphere. After 1 hour at this temperature, volatile material was vented, and heating was continued at about 320° C. for approximately 1 hour under a slow nitrogen flush and for an additional hour under vacuum (20–200 mm. Hg). Physical properties of each of the resulting polyamides are shown in Table I, and mechanical properties of compression molded samples of these polymers are given in Table II. In each of the tables the polyamide is designated in the following manner. The amine employed is shown on the left of the hyphen. In each instance the amine was either bis(4-aminocyclohexyl)methane, designated as PACM, or 2,2-bis(4-aminocyclohexyl)propane, designated as PACP. A subscript folowing PACM or PACP represents the percent *trans-trans* isomer content in the amine used. When no subscript follows PACM, the *trans-trans* isomer content in the amine was 54 percent. The acid or acids employed are shown on the right of the hyphen. When more than one acid was used, the mole ratio of the acids employed is shown in parentheses following the designation of the acids. In each instance, except for PACM-8 polyamide used as a control polymer outside the scope of this invention, the acid 1,1,3-trimethyl-5-carboxy-3-(p-carboxyphenyl)indane, designated as PIDA, was used. A second or third acid, if used, was adipic acid, suberic acid, azelaic acid, or dodecanedioic acid, designated by the number 6, 8, 9, or 12, respectively. For example, PACM-8/PIDA (75/25) was a polyamide produced by the polymerization of PACM having a *trans-trans* isomer content of 54 percent with a mixture of suberic acid and PIDA in a mole ratio of 75 to 25, respectively. The control polymer PACM-8 was a polyamide prepared from PACM and suberic acid.

The mechanical properties shown in Table II were determined on compression molded samples.

TABLE I

| Run No. | Polyamide | Inherent viscosity [a] | Polymer melt temperature, ° C.[b] |
|---|---|---|---|
| 1 | PACM-8/PIDA (85/15) | 0.86 | 240 |
| 2 | PACM-8/PIDA (80/20) | 0.82 | 240 |
| 3 | PACM-8/PIDA (75/25) | 0.78 | 245 |
| 4 | PACM-8/PIDA (70/30) | 0.64 | 250 |
| 5 | PACM-8/PIDA (60/40) | 0.59 | 275 |
| 6 | PACM-8/PIDA (50/50) | 0.68 | 275 |
| 7 | PACM-8/PIDA (25/75) | 0.58 | 300 |
| 8 | PACM(29)-8/PIDA (75/25) | 0.66 | 250 |
| 9 | PACM(69)-8/PIDA (75/25) | 0.78 | 250 |
| 10 | PACM-9/PIDA (75/25) | 0.90 | 250 |
| 11 | PACM-9/PIDA (70/30) | 0.78 | 265 |
| 12 | PACM-9/PIDA (60/40) | 0.86 | 275 |
| 13 | PACM-12/PIDA (75/25) | 0.94 | 235 |
| 14 | PACM-12/PIDA (70/30) | 0.87 | 235 |
| 15 | PACM-12/PIDA (60/40) | 0.72 | 250 |
| 16 | PACM-6/9/PIDA (40/40/20) | 0.91 | 230 |
| 17 | PACP(64)-8/PIDA (75/25) | 0.65 | 260 |
| 18 | PACM-PIDA | 0.33 | 320 |
| 19 | PACM-8 | 1.08 | 270 |

[a] Measured at 30° C. on m-cresol solutions having a polyamide concentration of 0.5 g./100 ml. solution.
[b] Determined by placing the polymer on a heated bar with a temperature gradient.

TABLE II

| Polyamide | Tensile strength, p.s.i. ×10⁻³ [a] | Elongation, percent [a] | Flexural modulus, p.s.i. ×10⁻⁵ [b] | Izod impact strength, ft.-lbs./in. notch [c] | Heat deflection temperature, 264 p.s.i., ° F.[d] |
|---|---|---|---|---|---|
| PACM-8/PIDA (85/15) | | | | Tough | |
| PACM-8/PIDA (80/20) | 11.1 | 41 | 2.8 | 1.8 | 321 |
| PACM-8/PIDA (75/25) | 11.0 | 39 | 2.8 | 1.6 | 323 |
| PACM-8/PIDA (70/30) | 8.4 | 10 | 2.9 | 0.9 | 344 |
| PACM-8/PIDA (60/40) | 8.9 | 10 | 3.1 | 1.0 | 357 |
| PACM-8/PIDA (50/50) | | | | Tough | |
| PACM-8/PIDA (25/75) | | | | do | |
| PACM(29)-8/PIDA (75/25) | 9.6 | 10 | 2.9 | 1.0 | 312 |
| PACM(69)-8/PIDA (75/25) | 11.8 | 31 | 3.0 | 1.5 | 331 |
| PACM-9/PIDA (75/25) | 8.9 | 16 | 3.0 | 1.0 | 275 |
| PACM-9/PIDA (70/30) | 8.0 | 10 | 2.8 | 0.6 | 307 |
| PACM-9/PIDA (60/40) | 5.6 | 6 | 2.9 | 0.6 | 333 |
| PACM-12/PIDA (75/25) | 9.4 | 28 | 2.4 | 1.2 | 280 |
| PACM-12/PIDA (70/30) | 9.9 | 32 | 2.5 | 1.6 | 299 |
| PACM-12/PIDA (60/40) | 11.1 | 18 | 2.6 | 1.4 | 313 |
| PACM-6/9/PIDA (40/40/20) | 11.2 | 18 | 3.0 | 1.3 | 336 |
| PACP(64)-8/PIDA (75/25) | 11.4 | 17 | 3.2 | 0.9 | 360 |
| PACM-PIDA | | | | Brittle | |
| PACM-8 | 10.6 | 18 | 2.7 | 2.9 | 286 |

[a] ASTM D 638-68.  [b] ASTM D 790-66.  [c] ASTM D 256-56.  [d] ASTM D 648-56.

All of the polyamides described in Tables I and II except PACM-8 were amorphous, optically clear polymers within the scope of this invention, the best properties being exhibited by the copolyamides, in which at least two dicarboxylic acids were employed as monomers. The tables show that polymers with a good balance of properties were obtained when suberic, azelaic, or dodecanedioic acid was employed as a dicarboxylic acid monomer used with the PIDA in various proportions.

A polymer having good properties also was obtained when a mixture of PIDA, adipic acid, and azelaic acid was used in its preparation. The use of PACM having a *trans-trans* content ranging from 29 percent to 69 percent with PIDA and suberic acid gave polyamides exhibiting good properties, the best properties resulting from the use of PACM having a *trans-trans* content of 54 percent or 69 percent. Replacement of PACM with PACP as the diamine component in polymerization with PIDA and suberic acid was demonstrated to give a polyamide having good properties. The PACM-8/PIDA polymers all exhibited greater stiffness and greater property retention at elevated temperatures than did the control polymer PACM-8, as shown by the higher values for flexural modulus and heat deflection temperature. Furthermore, upon heating a 0.5 g. a sample of finely ground PACM-8 polyamide in a refluxing 6 N aqueous hydrochloric acid for 2 hours, the polymer melt temperature of the polymer decreased 110° C. and the inherent viscosity was reduced to 16 percent of its value prior to this treatment. Upon like treatment, a 0.5 g. sample of finely ground PACM-8/PIDA (75/25) underwent a decrease in polymer melt temperature of only 10° C. and 47 percent of the initial inherent viscosity was retained. Thus, the hydrolytic stability of PACM-8/PIDA (75/25) was much greater than that of PACM-8.

EXAMPLE II

Filled PACM-8/PIDA (75/25) polyamide specimens, prepared by incorporating glass fibers (as ¼-inch chopped strands), titanium dioxide, of wollastonite, were evaluated. The unfilled polyamide specimens, the nomenclature for which is as described in Example I, were prepared by the general procedure given in Example I. Properties of the unfilled and filled polyamides are shown in Table III, these properties being determined as described in Example I. The mechanical properties were determined on injection molded samples.

The amorphous character of the polymers in the preceding examples was determined by differential thermal analysis. There is a possibility that a small degree of crystallinity not detectable by the method employed might be observed by some other method. Accordingly, the polymers of the invention are characterized as being substantially amorphous.

I claim:

1. An amorphous, optically clear solid copolyamide resistant to acid hydrolysis consisting essentially of the polymeric condensation product of
   (a) at least one bis(4-aminocyclohexyl)methane or a methyl derivative thereof of the formula

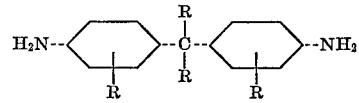

wherein each R is hydrogen or a methyl radical,
   (b) at least one phenylindanedicarboxylic acid or an alkyl derivative thereof of the formula

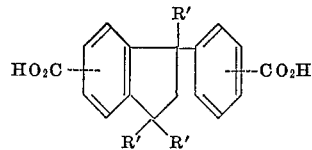

wherein each R' is hydrogen or an alkyl radical having 1-3 carbon atoms, and
   (c) at least one straight chain dicarboxylic acid having from 6–18, inclusive, carbon atoms per molecule; wherein the molar ratio of (a) to the total of (b) and (c) is approximately 1:1 and (c) constitutes 15–85 mole percent of the total of (b) and (c).

2. The copolyamide of claim 1 wherein

TABLE III

| Run No. | Inherent viscosity of unfilled polyamide | Filler weight percent [a] | Tensile strength, p.s.i. ×10⁻³ | Elongation, percent | Flexural modulus, p.s.i. ×10⁻⁵ | Izod impact strength, ft.-lbs./in. notch | Heat deflection temperature, 264 p.s.i., °F |
|---|---|---|---|---|---|---|---|
| 1 | 0.51 | None | 6.4 | 3 | 3.1 | 0.3 | 309 |
| 2 | 0.51 | Glass fibers, 33 | 14.7 | 3 | 11.7 | 1.6 | 348 |
| 3 | 0.81 | None | 11.5 | 73 | 3.0 | 1.5 | 318 |
| 4 | 0.81 | Glass fibers, 30 | 19.4 | 4 | 9.8 | 1.5 | 347 |
| 5 | 0.66 | None | 11.1 | 33 | 3.0 | 1.3 | 311 |
| 6 | 0.66 | Titanium dioxide, 5 | 6.5 | 4 | 3.2 | 0.6 | 304 |
| 7 | 0.66 | Wollastonite, 50 | 10.0 | 3 | 7.8 | 0.6 | 331 |

[a] Based on total weight of polymer and filler.

As shown in Table III, incorporation of glass fibers, titanium dioxide, or wollastonite in a PACM-8/PIDA (75/25) polyamide resulted in a filled polymer having good mechanical properties which in some instances were better than those of the unfilled polymer used as a control. For example, the use of glass fibers markedly increased the tensile strength, flexural modulus, and heat deflection temperature of both the polyamide of low inherent viscosity and the preferred polyamide of high inherent viscosity. The use of titanium dioxide provided a means for preparing white, opaque objects having acceptable mechanical properties, and the wollastonite served to increase the flexural modulus and heat deflection temperature.

(a) is bis(4-aminocyclohexyl)methane (PACM),
(b) is 1,1,3-trimethyl-5-carboxy-3-(p-carboxyphenyl)indane (PIDA), and
(c) is suberic, azelaic or dodecanedioic acid, or a mixture of adipic and azelaic acids.

3. The copolyamide of claim 1 wherein
(a) is 2,2-bis(4-aminocyclohexyl)propane (PACP),
(b) is 1,1,3-trimethyl-5-carboxy-3-(p-carboxyphenyl)indane (PIDA), and
(c) is suberic acid.

4. The copolyamide of claim 1 wherein
(a) is bis(4-aminocyclohexyl)methane (PACM),
(b) is 1,1,3-trimethyl-5-carboxy-3-(p-carboxyphenyl)indane (PIDA) and (c) is suberic acid,
and said copolyamide contains a filler as a reinforcement element.

5. The copolyamide of claim 1 wherein
   (c) is suberic acid and constitutes about 75 mole percent of the total of (b) and (c).

6. The copolyamide of claim 1 wherein
   (a) is bis(4-aminocyclohexyl)methane (PACM) having a *trans,trans-isomer* content greater than 40 percent and
   (b) constitutes 50–80 mole percent of the total amount of (b) and (c).

7. The copolyamide of claim 1 containing a filler therein as a reinforcement element.

8. A textile fiber composed of the copolyamide defined in claim 1.

References Cited

UNITED STATES PATENTS

| | | | |
|---|---|---|---|
| 3,383,368 | 5/1968 | Ridgway | 260—78 R |
| 3,416,302 | 12/1968 | Knospe | 260—78 R |
| 3,393,210 | 7/1968 | Speck | 260—78 R |
| 3,703,595 | 11/1972 | Falkenstein et al. | 260—78 R |

HAROLD D. ANDERSON, Primary Examiner

U.S. Cl. X.R.

260—9, 33.4, 37 N, 78 SC